United States Patent
Archer

(10) Patent No.: US 8,248,371 B2
(45) Date of Patent: Aug. 21, 2012

(54) ACCELEROMETER SENSITIVE SOFT INPUT PANEL

(75) Inventor: Don G. Archer, Euless, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 555 days.

(21) Appl. No.: 12/340,214

(22) Filed: Dec. 19, 2008

(65) Prior Publication Data

US 2010/0156798 A1    Jun. 24, 2010

(51) Int. Cl.
*G06F 3/02* (2006.01)
(52) U.S. Cl. ..................... 345/169; 345/158
(58) Field of Classification Search .............. None
See application file for complete search history.

(56) References Cited

U.S. PATENT DOCUMENTS

| | | | |
|---|---|---|---|
| 5,602,566 A * | 2/1997 | Motosyuku et al. | 345/684 |
| 6,466,198 B1 * | 10/2002 | Feinstein | 345/158 |
| 6,798,429 B2 * | 9/2004 | Bradski | 345/156 |
| 2003/0201972 A1 * | 10/2003 | Usuda | 345/156 |
| 2007/0002018 A1 * | 1/2007 | Mori | 345/158 |
| 2007/0268246 A1 * | 11/2007 | Hyatt | 345/156 |
| 2009/0153466 A1 * | 6/2009 | Tilley | 345/156 |
| 2010/0030549 A1 * | 2/2010 | Lee et al. | 704/4 |
| 2010/0053089 A1 * | 3/2010 | Kwok et al. | 345/173 |

* cited by examiner

*Primary Examiner* — Jason Olson

(57) ABSTRACT

A virtual keyboard may be created on the display screen or soft input panel of a portable electronic device. The virtual keyboard may be created such that it is larger than the screen size of the portable electronic device. The virtual keyboard may be moved or slid across the screen to gain access to the keys thereon. Movement of the portable electronic device may be used to cause a corresponding movement of the virtual keyboard. The movement of the portable electronic device may be measured through the use of accelerometer data. The virtual keyboard may be configured by the user of the portable electronic device.

21 Claims, 8 Drawing Sheets

ACCELEROMETER SENSITIVE SOFT INPUT PANEL

BACKGROUND INFORMATION

Many people may own a portable electronic device. These portable electronic devices may include mobile phones (e.g., cellular or cell phones) and personal digital assistants (PDAs). Portable electronic devices may have increasing capability beyond voice communications. Many portable electronic devices may incorporate an input device, such as a keyboard or touch screen, to input characters into the portable electronic device.

Portable electronic devices may have a hard input panel, such as a keyboard having keys with letters, numbers, and symbols upon them. Such a keyboard may be modeled on a conventional keyboard, such as a typewriter keyboard or computer keyboard. The keyboard may be smaller in size than such a conventional keyboard. The keys may have multiple letters, numbers, or symbols upon them to maximize efficiency for the smaller size. The keys may be small in size, such as being smaller than a conventional keyboard. In some cases, the keys may be smaller than a typical adult fingertip. In such embodiments, smaller key size may lead to difficulty in entering information, such as hitting of incorrect keys.

Portable electronic devices may have a soft input panel where the input is entered through the display or screen of the portable electronic device, such as a touch screen. The input to the portable electronic device may be completed using a finger or an object, such as a stylus. Some portable electronic devices allow input only using a particular method, depending on the portable electronic device configuration. For example, some portable electronic devices require that a finger be used with the soft input panel; a stylus may not work to perform entry due to the configuration of the input panel. The soft input panel may display a virtual keyboard that is a replica of a conventional computer keyboard, such as a QWERTY type keyboard as may be commonly used. The virtual keyboard may be reduced in size, in comparison with a conventional computer keyboard, to fit onto the screen of the portable electronic device. As a result of being reduced in size, the keys displayed on the screen may be small in size, such as being smaller than a standard key on a conventional computer keyboard. The size may be such that the key is smaller than a typical adult fingertip.

Increasingly, portable electronic devices may incorporate an accelerometer. The accelerometer may be used by applications to sense the orientation of the portable electronic device in space and respond accordingly, such as by rotating the display output. For example, some applications may cause the screen display to rotate in response to the portable electronic device being rotated. For example, the screen display may rotate from portrait to landscape and vice versa. Such an application may keep the display in a certain orientation for the user, regardless of the orientation of the portable electronic device. Such accelerometers may measure movement of the portable electronic device in up to three dimensions.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Figure 1:
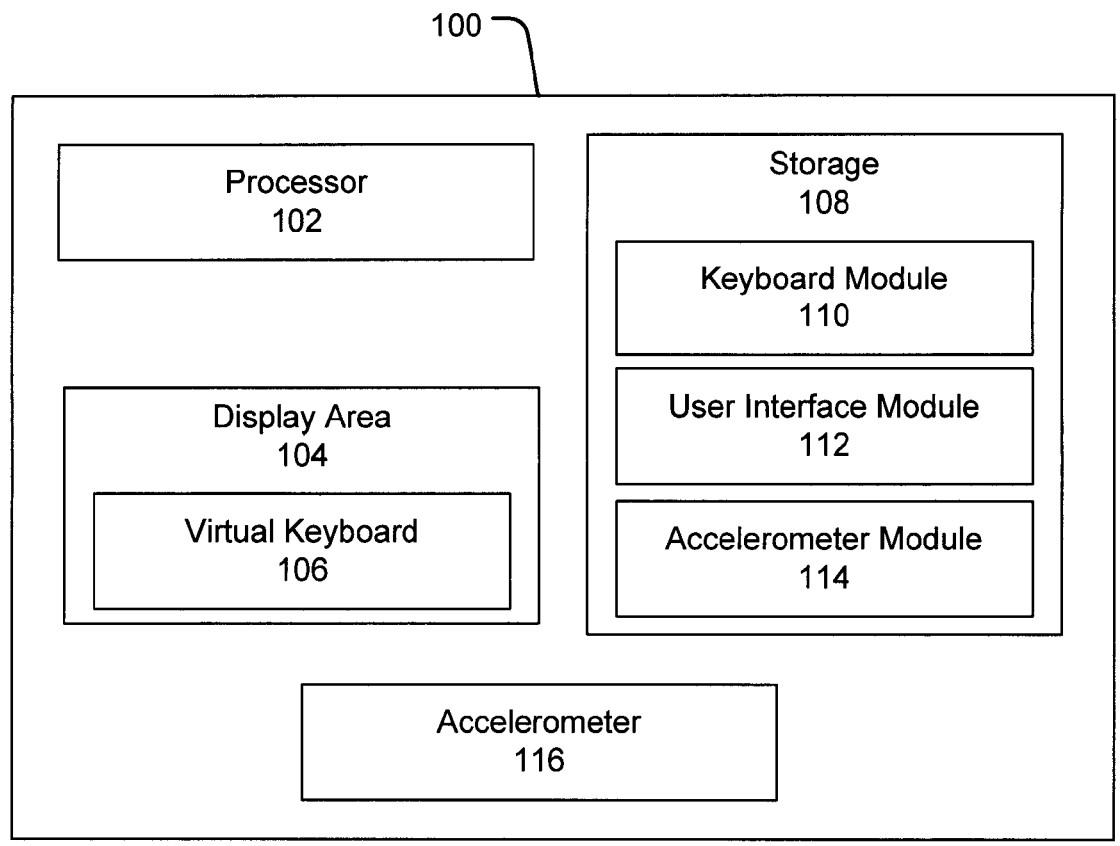
FIG. 1 depicts a block diagram of an architecture of a portable electronic device in accordance with an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

Exemplary embodiments may provide a system and method for creating and displaying a virtual keyboard on a portable electronic device. The virtual keyboard may be virtual since it may be displayed on the screen of the portable electronic device. The portable electronic device may have an accelerometer to allow response of the virtual keyboard to movement of the portable electronic device. The portable electronic device may use an accelerometer input. The accelerometer input may be in the form of signals or data from the accelerometer relating to the orientation of the portable electronic device in space. A touch screen may be used to allow the user to perform entry into the portable electronic device using the virtual keyboard. The virtual keyboard may be displayed on the screen of the portable electronic device, such as an Liquid Crystal Display (LCD). The virtual keyboard may be created by software programming or hardware resident in the portable electronic device and executed by a processor.

The virtual keyboard size may be a multiple of the screen width and/or height. For example, the virtual keyboard may be 3 times the width of the screen. As a result, the entire virtual keyboard may not be displayed on the screen. For example, only a section of the virtual keyboard may be displayed at one time. The virtual keyboard may have an input area to display the entries as they are entered to allow the user to view and correct data entered. The keys on the virtual keyboard may be large enough to allow a finger to use them. Alternatively, a stylus may be used for using the keys. The virtual keyboard may receive data from the accelerometer of the portable electronic device. The accelerometer input may be used to allow the virtual keyboard to move across the screen as the user of the portable electronic device inclines the phone. For example, the virtual keyboard may move or slide to the left when the portable electronic device is inclined to the left. The virtual keyboard may slide up and down in response to inclination up or down. For example, the user may incline the portable electronic device upward to cause the virtual keyboard to slide upward across the display. The virtual keyboard sliding movement may be coincident with the degree of incline of the portable electronic device. For example, inclining the portable electronic device at a steep angle to the horizontal may cause the keyboard to slide fast, whereas inclining the portable electronic device at a small angle may cause the keyboard to slide slowly. The rate of inclination may be used to control the speed of the virtual keyboard movement. For example, a quick inclination to the left may cause the virtual keyboard to slide quickly to the left, whereas a slow inclination may cause the virtual keyboard to slide at a slower pace.

Through the use of the inclination of the portable electronic device to control the movement of the virtual keyboard, the user may gain access to input keys that are not presently displayed upon the screen. By making the virtual keyboard larger than the display screen size, the individual keys of the virtual keyboard may be created larger in size than they might otherwise be able to be if the virtual keyboard was confined to the width and height of the display screen or soft input panel. Having larger keys may promote the use of fingertips to perform entry on the virtual keyboard. Using a fingertip instead of stylus to perform entry may allow faster entry since a user does not need to use a separate device and may mean that fewer steps are involved in entering data. It is understood that some devices may require the use of fingers to perform entry. In some devices, a stylus and/or fingers maybe used.

The description below describes computers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

The system implementing the method in accordance with exemplary embodiments may have components or modules associated with the portable electronic device to complete the steps of the method detailed below, such displaying data. The portable electronic device may contain one or more processors. The one or more processors may be each dedicated to the processing of the data on the portable electronic device or the one or more processors may be shared with other modules contained in the portable electronic device.

The modules on the portable electronic device may include a processor, a display area, a storage module, an accelerometer module, a keyboard module, and a user interface module. Other modules may be included. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

FIG. 1 depicts a block diagram of an architecture of a portable electronic device 100 in accordance with an exemplary embodiment. This exemplary embodiment is provided by way of example, as there are a variety of architectures to implement the systems and methods described herein. The portable electronic device 100 may be any portable electronic device which is capable of using accelerometer input and has a touch screen or soft input panel. The portable electronic device 100 may be a cell phone or another mobile communication device such as a personal digital assistant (PDA).

The personal electronic device 100 may include one or more processors, such as processor 102. The processor 102 may be used for processing data, such as accelerometer data and keyboard input. The processor 102 may be used for executing software instructions, such as those from the modules of the portable electronic device 100. Other functions may be performed by the processor as required. The processor 102 is shown as a separate module in FIG. 1, however in some embodiments, the processor 102 may be a distributed processor. The processor may be distributed among the various modules shown in FIG. 1. In other embodiments, the processor 102 may be shared with other functionality within the portable electronic device. The modules depicted in FIG. 1 may share the processor 102.

The processor 102 may include the operating system of the portable electronic device 100. The operating system may be any operating system or software that provides functionality and operation of the portable electronic device. The operating system may be an operating system capable of having certain functions modified or extended, such as the virtual keyboard. Such a modification may be made through the use of programming interfaces, such as Application Programming Interfaces or APIs. The programming interfaces may allow a third party, such as a user of the portable electronic device 100, to modify the functionality of certain features of the operating system. The behavior of features of the operating system may be altered.

The portable electronic device may include a display area 104. A virtual keyboard 110 may be displayed using the display area 104. The display area 104 may represent the portable electronic device 100 built-in display capabilities. For example, the virtual keyboard 110 may be displayed on a LCD screen associated with the portable electronic device 100. Other types of display screens may be used, such as plasma screens. The display of the portable electronic device 100 may be a touch screen. A touch screen may allow entry into the portable electronic device through pressure exerted on the screen at particular points on the screen. An input device, such as a fingertip or a stylus, may be used to exert pressure on the screen.

It is understood that different types of touch screens may be used with exemplary embodiments. For example, the screen may be a resistive touch screen. A resistive touch screen may allow the use of either a stylus or a finger and may have greater precision of input. Alternatively, a capacitive touch screen may be used. A capacitive touch screen may allow the use of a finger for input and may require a lighter exertion of pressure on the screen than a resistive touch screen but may sacrifice precision. However, use of a stylus on such a screen may not be possible. A capacitive touch screen may register an input by making the object exerting pressure on the screen a part of an electrical circuit grid which makes up the screen. Therefore, a stylus, typically being made of plastic, may not be conductive to allow circuit completion. It should be appreciated that a conductive stylus may be used, such as one made of metal. Other types of touch screens may be possible. Other objects, beside a stylus or finger, may be used with the touch screen for entry into the portable electronic device 100, as appropriate for the screen type, such as a pen or a pencil.

A storage module 108 may provide for storage of data and modules. The storage module 108 may consist of any suitable storage hardware or firmware or a combination thereof. In some embodiments, the storage module 108 may be removable from the portable electronic device 100. For example, the storage module 108 may be a removable memory card. A combination of removable and non-removable storage may be used. The storage module 108 may have temporary storage, such as a temporary cache or volatile storage, such as random access memory ("RAM"). The storage module 108 may provide distributed storage for data, such as storage distributed across the modules contained within the storage module. Alternatively, the storage module 108 may provide centralized storage for the portable electronic device 100. The storage module 108 may provide storage for modules, such as those depicted in FIG. 1, including a keyboard module 110, a user interface module 112, and an accelerometer module 114. Other modules may be included. The modules may represent software code or instructions. The processor 102 may provide execution for the functionality of the modules. The functionality of the modules 110, 112, and 114 will now be described.

A keyboard module 110 may generate a virtual keyboard, such as the virtual keyboard 106. The keyboard module 110 may instruct the display area 104 to display the virtual keyboard 106. The keyboard module may generate the virtual keyboard 106 in response to a command or action on or from the portable electronic device 100. The generation may be automatic based on a set of pre-determined rules. For example, executing a certain application on the portable electronic device 100 may cause a virtual keyboard to be generated. Alternatively, the keyboard generation may be in response to a user selection. For example, the user may select a keyboard icon on the screen to cause the virtual keyboard 106 to be generated. The keyboard module may receive inputs from the accelerometer module 114, as discussed below.

The virtual keyboard 106 may be sized to be a multiple of the display screen size. For example, the virtual keyboard 106 may be three times the width of the display screen of the portable electronic device 100. The virtual keyboard 106 may be the same size as the display screen. The virtual keyboard 106 may be sized to various multiples of the display screen size based on user input. It is understood that the sizing of the virtual keyboard in relation to the screen size may determine the actual size of the keys on the virtual keyboard 106. For example, the higher the screen size multiple, the larger the keys may appear on the display. For example, the key size may be 1 cm by 1 cm, to approximate key size on a typical QWERTY computer keyboard. The virtual keyboard 106 may be sized in both width and height based on the display screen size. A combination of width and height may be used. Alternatively, only width or height may be used in sizing the virtual keyboard. For example, the virtual keyboard may be sized to occupy the height of the display screen and be 2 times as wide as the display screen. Selection of such sizing may be done by the keyboard module 110 based on user input through the user interface module 110. A default size of the virtual keyboard 106 may be predetermined. The virtual keyboard 106 may incorporate an entry area to display inputs as entered by the user. Such an entry area may be a part of the virtual keyboard 106.

In some embodiments, it is understood the portable electronic device 100 may be positioned in different orientations such as portrait or landscape. In such positions, the screen height and width may change based on the orientation of the portable electronic device. For example, when changing from portrait to landscape orientation, the height and width of the screen are interchanged. The keyboard module 110 may account for such orientations and alter the orientation of the virtual keyboard 106 accordingly.

A user interface module 112 may provide user interaction with the portable electronic device 100 and the other modules of the portable electronic device 100. The user interface module 112 may receive user interaction with the portable electronic device. Alternatively, the user interaction module 112 functionality may be distributed among the other modules of the portable electronic device 100. For example, each module may have its own user interaction module. The user interface module 112 may provide for a suitable interface for the user, such as a graphical user interface (GUI) which may include a virtual keyboard. The capabilities of user interface module 112 may be limited by the capabilities of the personal electronic device 100. User input to the portable electronic device 100 through the user interface module 112 may be completed through such input devices as the virtual keyboard, a touch screen, a trackwheel, or any other input means for entering or inputting information to the portable electronic device 100.

An accelerometer module 114 may provide for receive, collate, process, and distribute accelerometer data, such as data from an accelerometer 116. Accelerometer 116 may be a three axis accelerometer. The accelerometer may measure linear acceleration. The acceleration measured may be the direction that gravity is acting on the portable electronic device. For example, the accelerometer 116 may measure acceleration relative to a pre-determined set of X, Y, and Z axes. In some embodiments, a two axis accelerometer may be used. Such an accelerometer may measure acceleration in two pre-determined axes. It is understood that the orientation of the axes of the accelerometer may be set as desired for the portable electronic device 100. For example, the X axis may be roll, the Y axis may be pitch, and the Z axis may be yaw. The user may have control over the accelerometer or the configuration thereof. In some embodiments, the user may have no control over the accelerometer module 114 and its configuration. The accelerometer module 114 may receive an output from the accelerometer 116. The accelerometer 116 output may be in the form of an analog or digital signal. The accelerometer module 114 may collate and process the output of the accelerometer 116. The processing may alter the form of the received signal. Alternatively, the accelerometer module 114 may use processor 102 to process the accelerometer output. The output may be processed to extract or transform the data to provide instructions to the keyboard module 110 for positioning of the virtual keyboard 108 on the display area 104.

In some embodiments, accelerometer 116 may be other than a physical accelerometer. For example, software, in conjunction with another physical device, such as a digital imaging device, may be used to simulate an accelerometer. The accelerometer module 114 may receive the signals or data from such alternatives and process them accordingly. In some embodiments, a Global Positioning System (GPS) input may be used.

FIGS. 2 through 5 depict keyboard architectures in accordance with exemplary embodiments. These architectures are provided by way of example, as there are a variety of architectures to configure a virtual keyboard. These keyboard architectures may represent the form of the virtual keyboard 106.

Figure 2A:
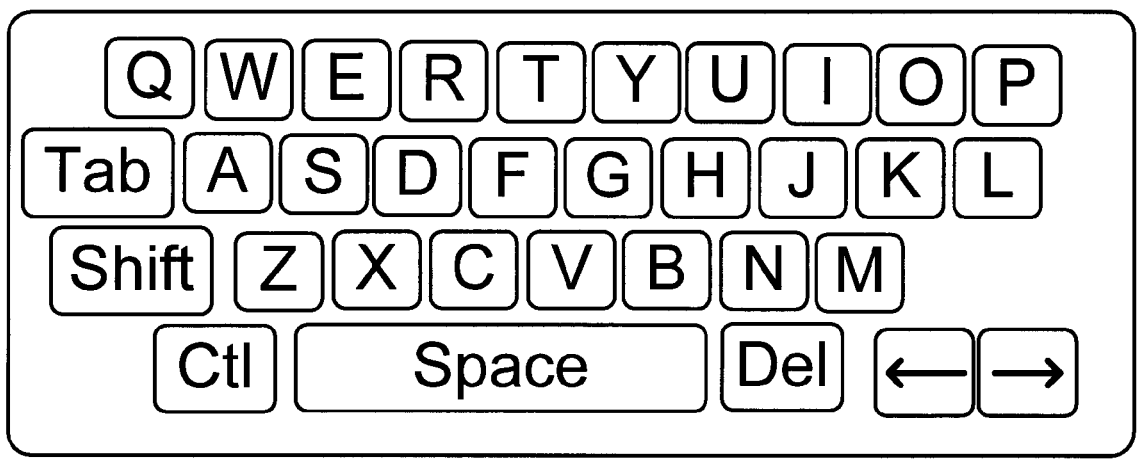
FIGS. 2A, 2B, and 2C depict an architecture of a virtual keyboard for a portable electronic device in accordance with an exemplary embodiment.
Figure 2B:
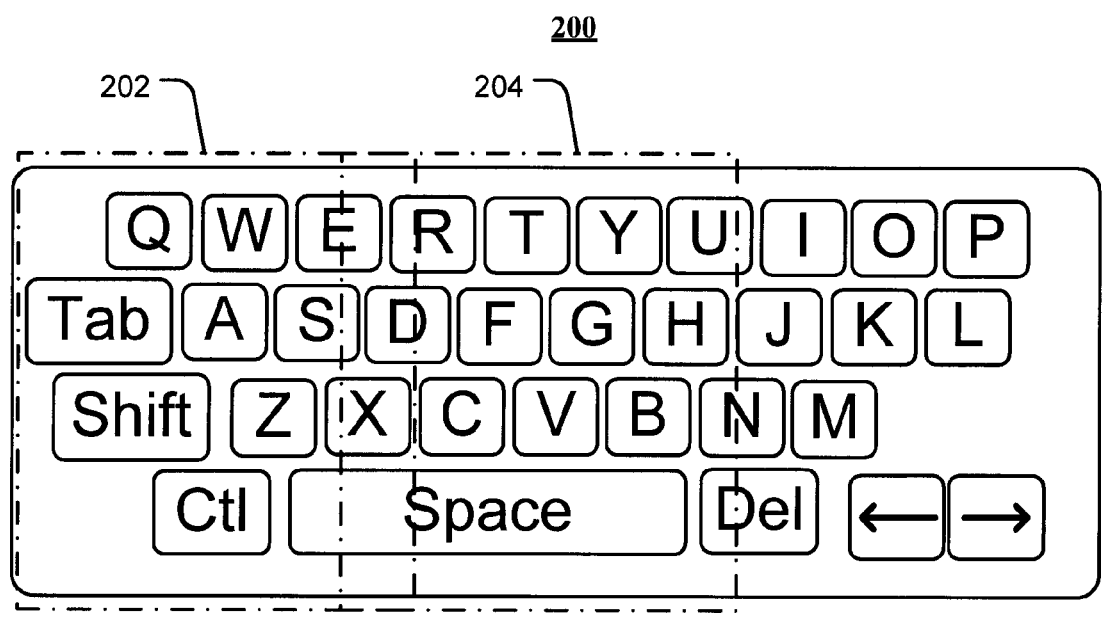
Figure 2C:
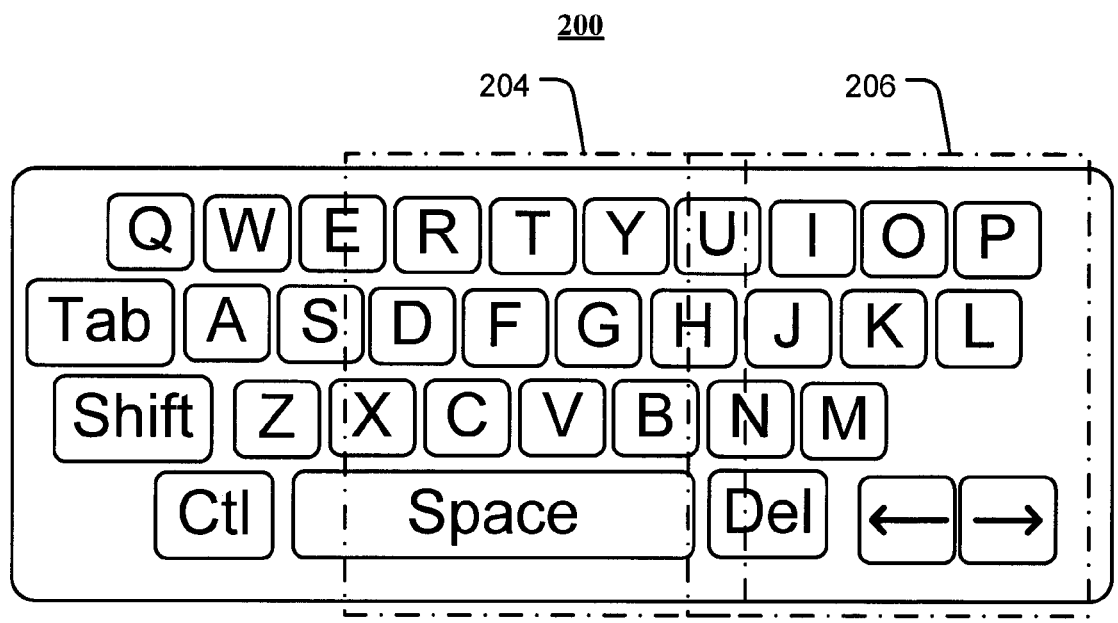

FIG. 2A depicts a virtual keyboard 200. The virtual keyboard 200 represents a basic set of keys for entry of text. The virtual keyboard 200 represents a QWERTY keyboard. FIGS. 2B and 2C include boxes 202, 204, and 206 which represent outlines of a simulated display area of the portable electronic device 100. The virtual keyboard 200 may be sized, as depicted, to virtually span three display areas as depicted by boxes 202, 204, and 206, with an overlapping section at the transition between virtual display areas. The embodiment shown spans one display area in height. It is understood that other sizing may be used. The overlap shown between boxes 202, 204, and 206 may be changed by the user. An entry display area (not shown) may be included with the virtual keyboard 200. The initial display area of the virtual keyboard may be set as a default setting. For example, the virtual keyboard section in box 204 may be displayed first. This default may be changed by the user. As the portable electronic device is moved, the virtual keyboard 200 may move between the boxes 202, 204, and 206 such that the area of the virtual keyboard 200 that may be displayed to the user may be altered. The movement of the virtual keyboard 200 may allow the user to access additional keys on the virtual keyboard 200. Through the movement of the portable electronic device 100, the virtual keyboard 200 may be dynamically positioned on the display screen.

Figure 3:
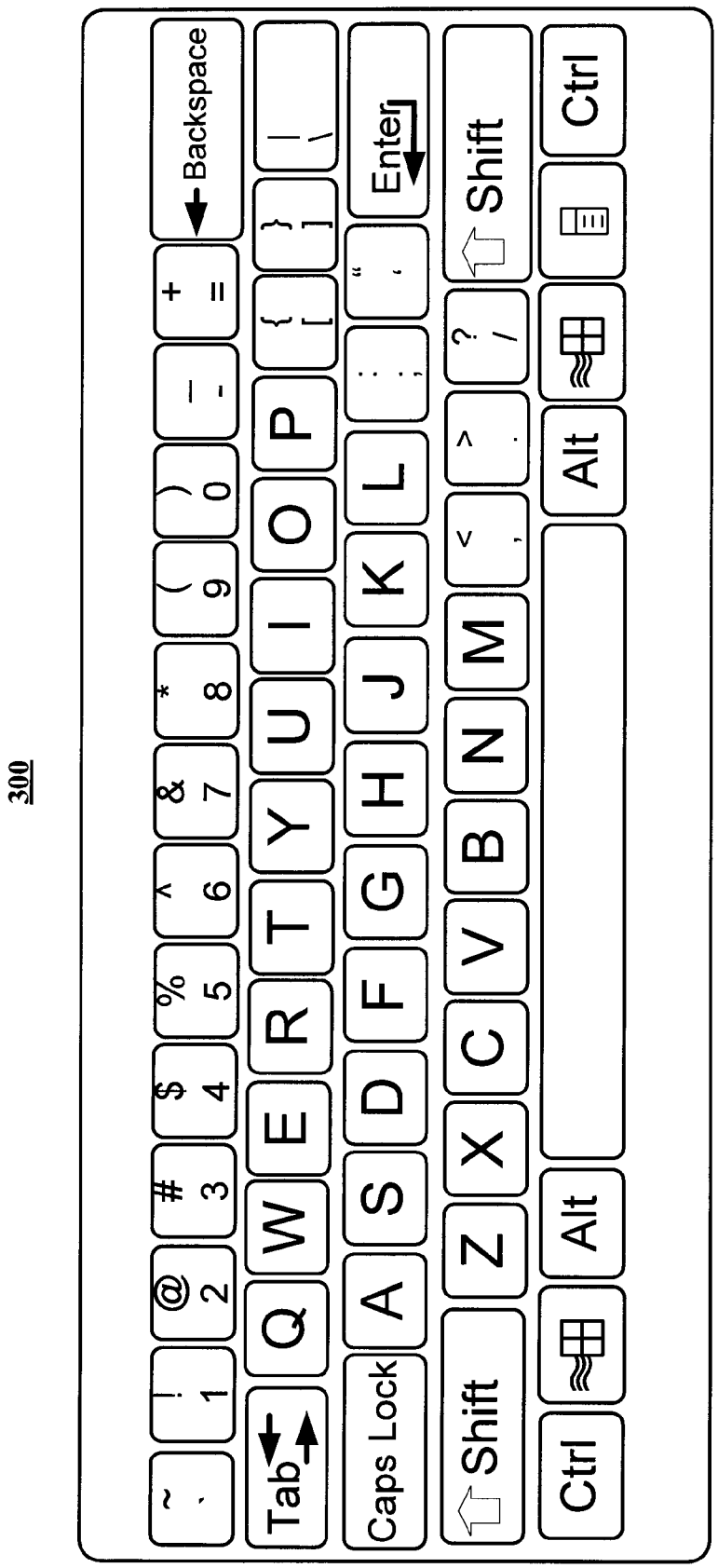
FIG. 3 depicts an architecture of a virtual keyboard for a portable electronic device in accordance with an exemplary embodiment.
Figure 4:
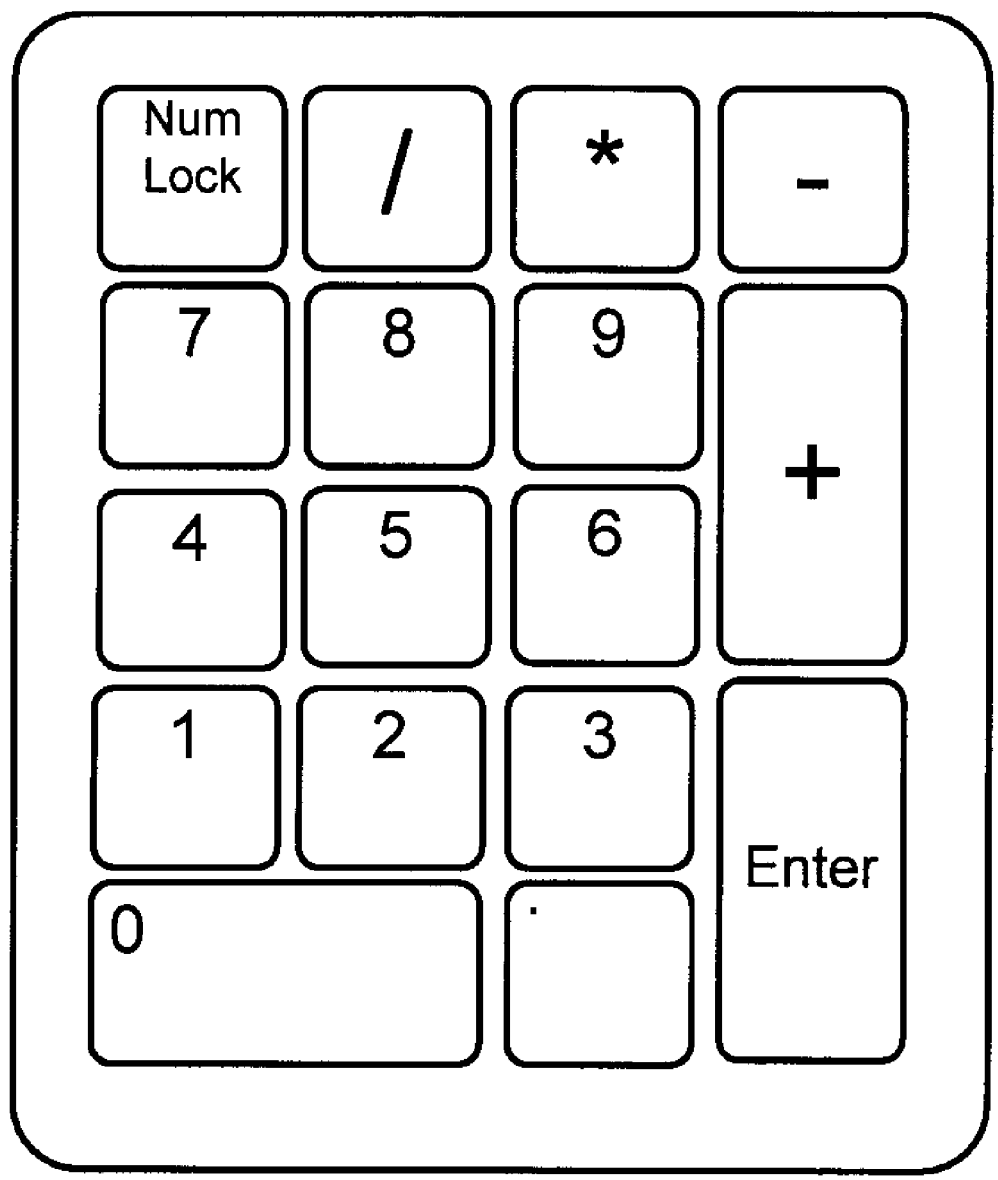
FIG. 4 depicts an architecture of a numeric keypad for a portable electronic device in accordance with an exemplary embodiment.
Figure 5:
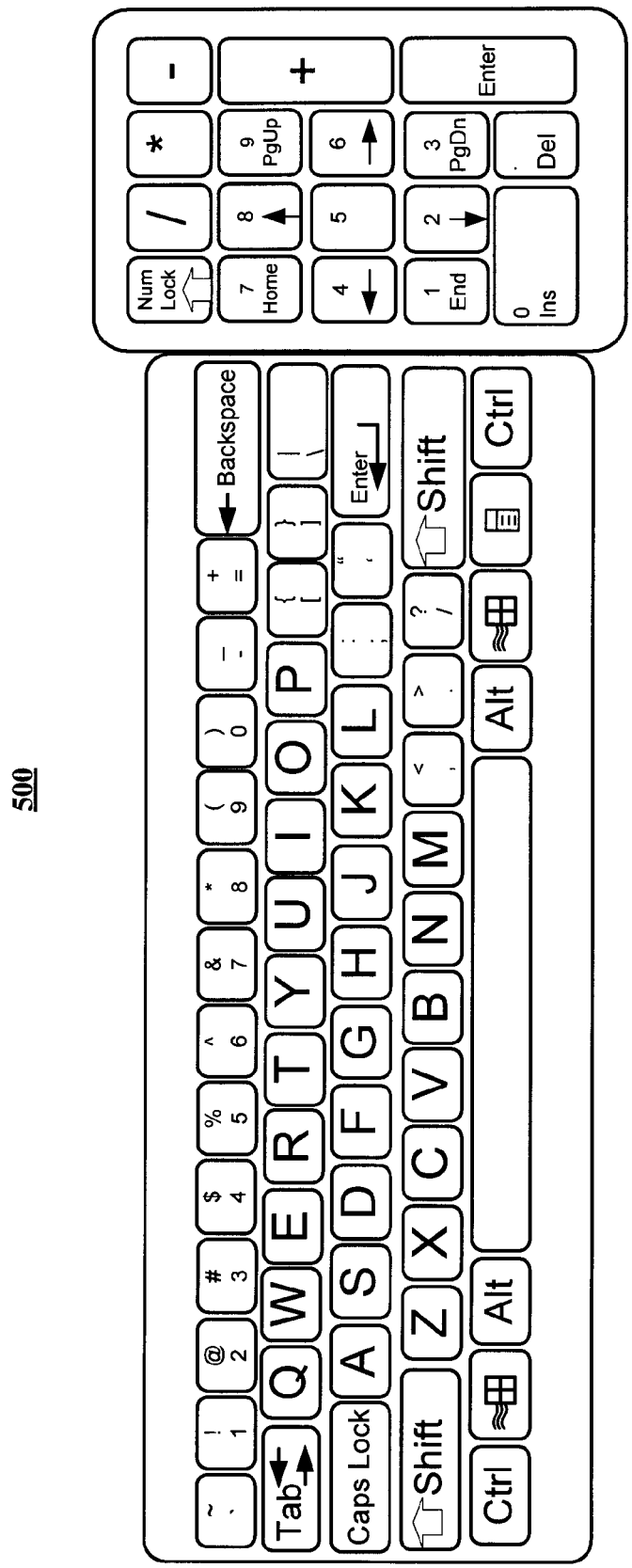
FIG. 5 depicts an architecture of a virtual keyboard with a numeric keypad for a portable electronic device in accordance with an exemplary embodiment.

FIG. 3 depicts a virtual keyboard 300 that may be used and contains added keys beyond the input keyboard 200. The virtual keyboard 300 represents a keyboard with keys arranged similar to a standard Windows computer keyboard, providing more functionality. FIG. 4 depicts numeric keypad 400, such as the number pad on a conventional computer keyboard which may be used to input numbers and mathematical operations. The numeric keypad 400 is arranged in a similar manner to a keypad on a standard computer keyboard. FIG. 5 depicts a virtual keyboard 500 which includes a numeric keypad. The virtual keyboard 500 may be similar to a conventional Windows computer keyboard.

Figure 6:
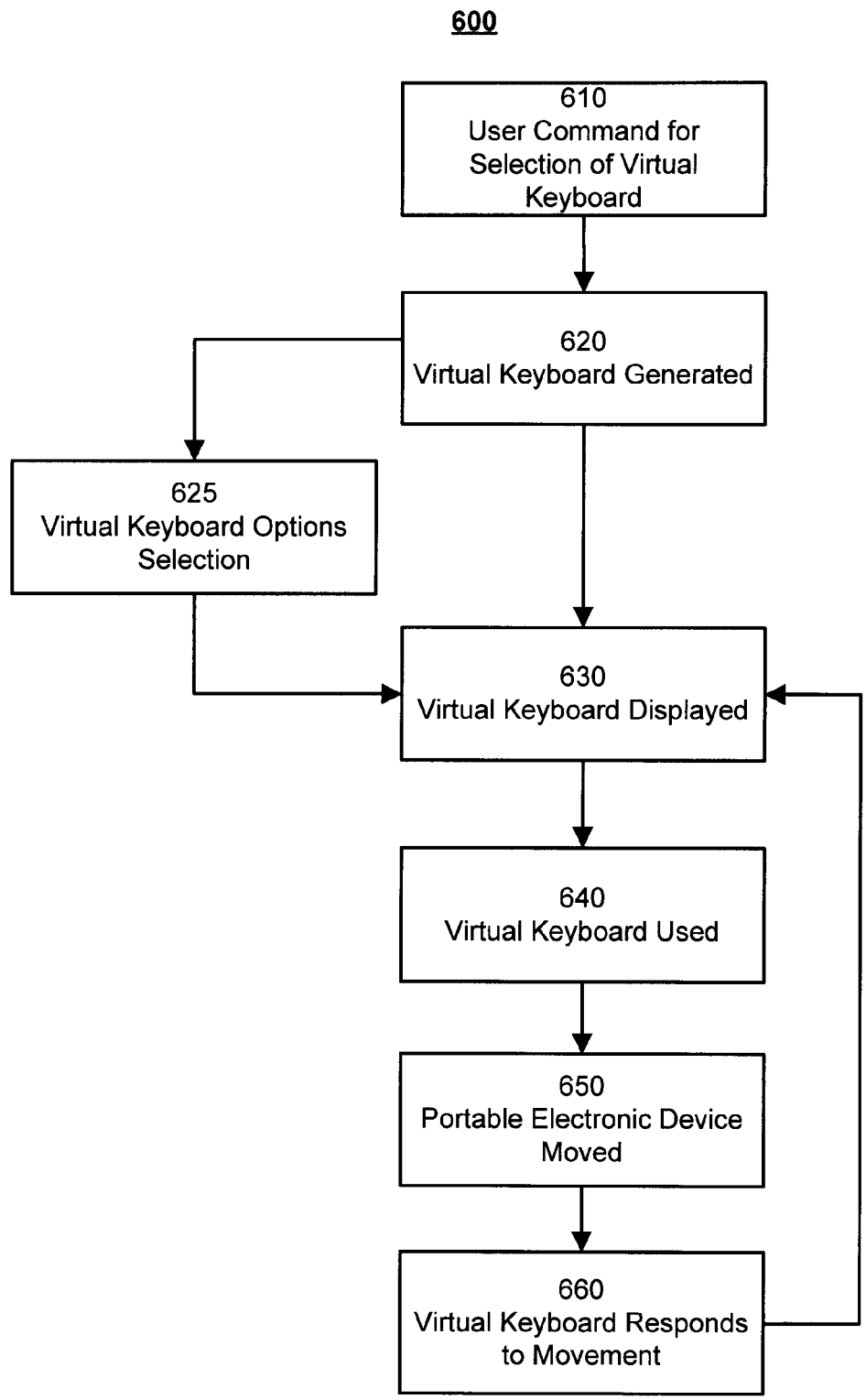
FIG. 6 depicts a flow chart of a method of creating and using a virtual keyboard in accordance with an exemplary embodiment.

FIG. 6 depicts a flow chart of a method in accordance with an exemplary embodiment. Exemplary method 600 is provided by way of example, as there are a variety of ways to carry out the methods disclosed herein. The method 600 as shown in FIG. 6 may be executed or otherwise performed by one or a combination of various systems, such as being computer implemented. The method 600 is described below as carried out on an exemplary system and architectures as shown in FIGS. 1-5 by way of example, and various elements of FIG. 1 are referenced in explaining the exemplary method of FIG. 6. Each block shown in FIG. 6 represents one or more processes, methods, or subroutines carried out in the exemplary method 600. Referring to FIG. 6, the exemplary method 600 may begin at block 610.

At block 610, a user command selection of a virtual keyboard may be performed. The selection may occur on a portable electronic device 100. For example, the user interface module 112 may receive the input of the user generating the command for a virtual keyboard to be displayed, such as the virtual keyboard 106. A virtual keyboard may be required to enter information into the portable electronic device, such as creating a contact or entering a Uniform Resource Locator ("URL") to call up an internet site. For example, a user with a cell phone may need to enter contact information into the cell phone. It should be appreciated that many reasons may exist to enter data or information into a portable electronic device that may require a virtual keyboard or a numeric keypad.

The user input to select, or call up, the virtual keyboard, may be entered into the portable electronic device using various input devices as a touch screen, a stylus, a trackwheel, a dedicated key, or any other input means for entering or inputting information to the portable electronic device 100. The selection may be performed by selecting an icon on the display using a touch screen. For example, a stylus may be used to select a keyboard icon on the screen of the portable electronic device. A trackwheel may be used to select an option from a menu or GUI. It should be appreciated that other various input methods and/or combinations thereof are possible.

Continuing, at block 620, the virtual keyboard may be generated. The virtual keyboard may be generated in response to the command from block 610. For example, the keyboard module 110 may receive the command from the user interface module 112. The keyboard module 110 may generate a virtual keyboard 106. The virtual keyboard 106 may be of various architectures, such as shown in FIGS. 2-5.

At block 625, input keyboard options may be selected. This step may be optional. In some embodiments, the method may go from block 620 to block 630. The options may be generated by the keyboard module 110. The user may be prompted, following initial selection at block 610, to select a particular keyboard architecture to generate. For example, the user may desire only a numeric keypad as shown in FIG. 4. The user may be presented with additional options to define the virtual keyboard 106, such as sizing, speed of response, etc. It is understood that various options are possible. The user may be presented options providing detailed control over the configuration, display, and behavior of the virtual keyboard 106. For example, the user may control the width and height of the keyboard by specifying multiples of the display screen size. Options may be presented to allow display of word options to complete the initial letters selected. For example, the user may enter "d" and "o" and a prompt may be displayed to select the word "dog". Such options may be presented through a series of menus on the screen. The user may select and alter the options desired. The user may be given the opportunity to save his or her choices. The choices may be saved in the storage module 108. The user may select an option to not be presented with such options menu during subsequent future uses of the virtual keyboard 106 and rely upon the saved/default choices. In such cases, the method may go from block 620 to block 630. The user may have an option to alter the options of block 625 at any time during the use of the virtual keyboard. A set of default options for the virtual keyboard 106 may be pre-determined for the portable electronic device 100. The user may elect to use the default options or may selectively change the default options.

At block 630, the virtual keyboard is displayed. For example, the keyboard module 110 may send a command to the display module 104 to display the keyboard 106. In generating the display command, the keyboard module 110 may receive data from the accelerometer module 112. The keyboard module 110 may use this data to determine the present orientation of the portable electronic device 100. The keyboard module 110 may then position and orient the keyboard 106 appropriately for use. For example, the keyboard module 110 may use the accelerometer data to calculate the present position of the portable electronic device in order to determine the center point and the orientation for the virtual keyboard 106. All subsequent movement of the virtual keyboard 106 may be based from this initial position.

Continuing at block 640, the virtual keyboard is used. The user of the portable electronic device 100 may use the keyboard as required to enter data or information into the portable electronic device. In using the keyboard, the user's finger or a stylus may be used to select the keys of the virtual keyboard 106 to enter information. For example, the user may use his or her index finger to enter a word by tapping the display of the portable electronic device to select the appropriate letters from the virtual keyboard 106. Alternatively, if the touch screen of the portable electronic device supports it, a stylus may be used for entry of such information. For example, a stylus that may be included with the portable electronic device 100 may be used or a substitute stylus, such as a pen, may be used.

At block 650, the portable electronic device is moved. Through the use of such an movement, the position of the virtual keyboard 106 may be changed on the display of the portable electronic device 100. For example, the movement may involve inclining or tilting the portable electronic device, such as, the user may tilt the portable electronic device 100 to the left. It is understood, the portable electronic device 100 may be moved or tilted in various directions, such as left, right, up, down, and/or combinations thereof. The direction of the movement may determine the direction of movement of the keyboard 106. The accelerometer module 114 may use the output from the accelerometer 116 to determine the extent of the incline.

Continuing at block 660, the virtual keyboard may respond to the movement. The keyboard module 110 may receive accelerometer data corresponding to the change in position of the portable electronic device 100. The data may be received from the accelerometer module 114. The keyboard module 110 may generate a command to move the keyboard appropriately in response to the change in position. The command may be sent to the display module 104. For example, in response to the left tilt or incline of the portable electronic device, the keyboard module 110 may command the virtual keyboard 106 to move to the left. Subsequently, the virtual keyboard 106, as seen by the user, will move to the left on the display of the portable electronic device 100. Based on such a move, the user may now select and use the additional keys that may be displayed.

The degree of incline or tilt of the portable electronic device may be used to determine the velocity of the change in display of the virtual keyboard. For example, the larger the degree of incline, the faster the virtual keyboard may move on the display. Alternatively, the rate of incline, such as the quickness at which the portable electronic device 100 is inclined, may determine the velocity of movement of the virtual keyboard 106. For example, a quick tilt of the portable electronic device 100 to the right may cause a quick slide or movement of the virtual keyboard 106 to the right.

The steps shown at blocks 630 through 660 may be repeated as required to enter the data or information into the portable electronic device 100.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A portable electronic device comprising:
a display area;
an accelerometer for measuring movement of the portable electronic device relative to a frame of reference; and
a processor for creating a virtual keyboard and causing the virtual keyboard to be displayed on the display area, determining whether to rotate and scroll the virtual keyboard in response to the movement of the portable electronic device, and determining the speed with which to rotate and scroll the virtual keyboard based on the three dimensional movement and rate of inclination of the portable electronic device.

2. The portable electronic device of claim 1, wherein the frame of reference comprises three axes.

3. The portable electronic device of claim 1, wherein the virtual keyboard is sized to span across at least a multiple of a height and width of the display area.

4. The portable electronic device of claim 1, wherein the display area is a touch screen configured to be pressure sensitive to receive input.

5. The portable electronic device of claim 4, wherein the display area receives input in response to pressure being exerted on the display area by an input device.

6. The portable electronic device of claim 1, wherein the portable electronic device is at least one of a cellular phone and a personal digital assistant.

7. The portable electronic device of claim 1, wherein the processor alters the display of the virtual keyboard in response to an input from a user.

8. The portable electronic device of claim 1, wherein velocity of the response of the virtual keyboard to movement of the portable electronic device coincides with at least a rate of movement of the portable electronic device.

9. The portable electronic device of claim 1, wherein velocity of the response of the virtual keyboard to movement of the portable electronic device coincides with at least an angular displacement of the portable electronic device.

10. The portable electronic device of claim 1, wherein the accelerometer comprises signals representing the movement of the portable electronic device.

11. A method, comprising:
displaying a virtual keyboard for a portable electronic device;
determining whether to rotate and scroll the display of the virtual keyboard in response to at least movement of the portable electronic device wherein an accelerometer detects at least the movement of the portable electronic device and further wherein the response comprises at least movement of the virtual keyboard relative to the display screen;
determining a speed with which to rotate and scroll the virtual keyboard based on the three dimensional movement and rate of inclination of the portable electronic device.

12. The method of claim 11, further comprising:
receiving an input from the virtual keyboard wherein the input is received from a user of the portable electronic device.

13. The method of claim 11, wherein the portable electronic device is at least one of a cellular phone and a personal digital assistant.

14. The method of claim 11, further comprising:
altering an appearance of the virtual keyboard in response to user input.

15. The method of claim 11, wherein the virtual keyboard spans across a multiple of the display screen such that the virtual keyboard is not entirely displayed with the display area at one time.

16. The method of claim 12, the step of receiving further comprising:

wherein the input is received from an input device.

17. The method of claim 12, wherein the input is in response to pressure being exerted on a display area by an input device.

18. The method of claim 11, wherein the response is based on a angular displacement of the portable electronic device.

19. The method of claim 11, wherein the response is based on a rate of movement of the portable electronic device.

20. The method of claim 11, wherein the virtual keyboard is sized to span across at least a multiple of a height and width of the display screen.

21. The method of claim 11, wherein the accelerometer is a three axis accelerometer.

* * * * *